US011995118B2

(12) United States Patent
Puniyani et al.

(10) Patent No.: US 11,995,118 B2
(45) Date of Patent: May 28, 2024

(54) METHODS AND SYSTEMS FOR UPDATING METADATA OF A MEDIA ASSET

(71) Applicant: Rovi Guides, Inc., San Jose, CA (US)

(72) Inventors: Aman Puniyani, Bangalore (IN); Ankur Anil Aher, Maharashtra (IN)

(73) Assignee: Rovi Guides, Inc., San Jose, CA (US)

( * ) Notice: Subject to any disclaimer, the term of this patent is extended or adjusted under 35 U.S.C. 154(b) by 281 days.

(21) Appl. No.: 16/017,706

(22) Filed: Jun. 25, 2018

(65) Prior Publication Data

US 2019/0392040 A1 Dec. 26, 2019

(51) Int. Cl.
*G06F 16/48* (2019.01)
*G06F 16/28* (2019.01)
*G06F 16/33* (2019.01)
*G06F 16/332* (2019.01)
*G06F 16/40* (2019.01)
*G06F 16/43* (2019.01)
*G06F 16/438* (2019.01)
*G06F 40/289* (2020.01)
*H04N 21/4788* (2011.01)
*H04N 21/81* (2011.01)

(52) U.S. Cl.
CPC .......... *G06F 16/48* (2019.01); *G06F 16/3323* (2019.01); *G06F 16/3329* (2019.01); *G06F 16/3344* (2019.01); *G06F 16/40* (2019.01); *G06F 16/43* (2019.01); *G06F 16/438* (2019.01); *G06F 40/289* (2020.01); *H04N 21/4788* (2013.01); *H04N 21/8133* (2013.01)

(58) Field of Classification Search
CPC .... G06F 16/48; G06F 16/438; G06F 16/3323; G06F 16/3329; G06F 16/3344; G06F 40/289; G06F 16/40; G06F 16/43; H04N 21/4788; H04N 21/8133
See application file for complete search history.

(56) References Cited

U.S. PATENT DOCUMENTS

| | | | |
|---|---|---|---|
| 6,239,794 B1 | 5/2001 | Yuen | |
| 6,564,378 B1 | 5/2003 | Satterfield | |
| 7,165,098 B1 | 1/2007 | Boyer | |
| 7,761,892 B2 | 7/2010 | Ellis | |
| 8,046,801 B2 | 10/2011 | Ellis | |
| 10,360,252 B1* | 7/2019 | Kraytem | G06F 3/0482 |
| 2002/0174430 A1 | 11/2002 | Ellis | |
| 2005/0251827 A1 | 11/2005 | Ellis | |
| 2009/0125499 A1* | 5/2009 | Cross | H04L 67/306 |
| 2009/0125560 A1* | 5/2009 | Munekuni | G06F 16/58 |

(Continued)

*Primary Examiner* — Kris E Mackes
*Assistant Examiner* — Lin Lin M Htay
(74) *Attorney, Agent, or Firm* — Haley Guiliano LLP

(57) ABSTRACT

Systems and methods are described for generating metadata for a media asset. The system retrieves an associated first metadata item for a media asset, where the first metadata item includes a first label field and an associated first data field. The system tries to fill in the first data field by looking it up in a remote database. If the remote database lacks data needed to fill in the first data field, the system generates a natural language request and publishes it to a plurality of users. The system analyzes a plurality of replies received in response to the published request to identify a text segment that is common to at least some of the replies. The system fills in the first data field with the identified text segment.

19 Claims, 7 Drawing Sheets

(56) References Cited

U.S. PATENT DOCUMENTS

| | | | |
|---|---|---|---|
| 2009/0307201 A1* | 12/2009 | Dunning | G06F 16/634 |
| | | | 707/999.005 |
| 2010/0153885 A1 | 6/2010 | Yates | |
| 2011/0078174 A1* | 3/2011 | Lee | H04N 21/4882 |
| | | | 707/769 |
| 2012/0016678 A1* | 1/2012 | Gruber | G06F 9/54 |
| | | | 704/275 |
| 2013/0151572 A1* | 6/2013 | Brocato | G06F 16/2428 |
| | | | 707/805 |
| 2013/0339998 A1* | 12/2013 | Arme | H04N 21/6543 |
| | | | 725/32 |
| 2014/0072948 A1* | 3/2014 | Boguraev | G09B 7/00 |
| | | | 434/362 |
| 2016/0147828 A1* | 5/2016 | Yu | G06F 16/3329 |
| | | | 705/31 |
| 2016/0154892 A1* | 6/2016 | Carrier | G06F 16/3344 |
| | | | 707/691 |
| 2016/0171900 A1* | 6/2016 | Allen | G09B 7/02 |
| | | | 434/322 |
| 2016/0179796 A1* | 6/2016 | Agarwal | G06F 16/438 |
| | | | 707/722 |
| 2017/0177621 A1* | 6/2017 | Cardonha | G06N 5/04 |

* cited by examiner

US 11,995,118 B2

METHODS AND SYSTEMS FOR UPDATING METADATA OF A MEDIA ASSET

BACKGROUND

Modern computer systems and computerized media delivery systems frequently encounter a problem of absence of appropriate metadata for stored media. Metadata is commonly used for identifying media, searching for media, filtering media, and providing media recommendations. Accordingly, absence of appropriate metadata can significantly deteriorate the performance of a computerized media delivery system. For example, such a system may not be able to display correct information in response to a user request. In another example, such a system may not be able to find matching media in response to a user query. Conventional systems at best may attempt to access other (e.g., third-party) databases to retrieve the missing metadata. However, if a particular metadata item is missing from the third-party database, modern computerized media delivery systems are generally unable to automatically acquire the missing metadata.

SUMMARY

Accordingly, a media guidance application may leverage a multi-user forum accessible to many users to automatically acquire a missing metadata item. For example, the user's DVR may store a movie with an unknown title. In another example, a media delivery system may store a copy of the movie "Titanic," but may be missing information about who the lead actress in that movie was. It should be noted that the actions described herein may be performed outside the media guidance application, for example, by a stand-alone application.

The media guidance application may post a natural language request on a multi-user forum asking the users to provide the missing metadata. For example, the media guidance application may post the question "Who was the lead actress in Titanic?" In another example, the media guidance application may post a screenshot of the stored movie and post the question "What is this movie called?" In yet another example, the media guidance application may post the question "What movie is this YouTube clip from?"

In some embodiments, the media guidance application may monitor and analyze the received replies to identify the missing metadata. For example, the media guidance application may identify a text segment that commonly occurs in multiple replies from multiple users. In some embodiments, the media guidance application may store the identified text segment as the missing metadata. The technique described above significantly improves the operation of the media storage and delivery system by allowing for an automatic recovery of the missing metadata where no readily available source for such metadata exists. Additionally, once the metadata is properly updated, the future operations of the media guidance application are significantly improved, because the media guidance application is now able to use the newly generated metadata to conduct media asset searches and to recommend media assets to the user based on that metadata.

The media guidance application may retrieve, for a media asset, an associated first metadata item, where the first metadata item includes a first label field and an associated first data field. For example, the media guidance application may retrieve from local storage all metadata associated with a stored movie, "Titanic." In another example, the retrieved metadata may include the label "Lead Actress" and an associated data field. In some embodiments, the media guidance application may determine that the data field associated with the label "Lead Actress" is empty or blank. In yet another example, the media guidance application may determine that a YouTube clip lacks metadata identifying a media asset it was clipped from.

The media guidance application may access a metadata repository that stores a plurality of metadata items for the media asset. For example, the media guidance application may access a remote media guidance data source that stores metadata items for multiple movies. The media guidance application may further determine that the plurality of metadata items does not include a second metadata item with a second label field that matches the first label field. For example, the media guidance application may determine that the metadata repository also does not have any metadata matching the label "Lead Actress" for the movie "Titanic."

The media guidance application may generate a natural language request to provide a value for the first data field associated with the first label field. For example, the media guidance application may generate a textual request: "Hi everyone! Does anyone here know who the lead actress is in the movie Titanic?"

The media guidance application may then publish the natural language request to a plurality of users. For example, the media guidance application may post that request on a multi-user forum (e.g., on a website dedicated to movies) where users can post replies (e.g., in a comment section).

The media guidance application may determine that a plurality of replies was received in response to the request. For example, the media guidance application may monitor the comment of the multi-user forum to determine that at least one new reply was posted in reply to the natural language request.

The media guidance application may analyze the replies by comparing each reply of the plurality of replies with each other reply of the plurality of replies. For example, the media guidance application may select a text segment of a first reply and compare each segment with each other reply to identify that this text segment is present in other replies. The media guidance application may further select a text segment that is common to at least some replies of the plurality of replies. For example, if the text segment "Kate Winslet" appears in several responses posted on the multi-user forum, the media guidance application may select that text segment.

The media guidance application may set the first data field to the text segment. In this way, the media guidance application would have successfully acquired the correct missing metadata. For example, the media guidance application may now have correct data field "Kate Winslet" associated with a label filed "Lead Actress" for a media asset (e.g., the movie "Titanic"). The operations of the media guidance application are now significantly improved. For example, if the user searches for movies with Kate Winslet in them, the media guidance application may correctly identify "Titanic" as a movie that matches that criterion. In another example, when the user searches for locally stored clips of the movie "Titanic," the media guidance application may correctly identify the relevant clips.

In some embodiments, the media guidance application may generate the natural language request by searching a template database to identify a stored natural language request template that includes metadata that matches the first label field. For example, the media guidance application may store multiple natural language templates associated with requests for different metadata labels. For example, the media guidance application may store a natural language template, "Hey everyone! Does anyone know who the [INSERTION FIELD 1] was in [INSERTION FIELD 2]?" This template may be used to ask for the name of a lead actress or a lead actor by replacing the [INSERTION FIELD 1] with text "Lead Actress" or "Lead Actor." This template may also be modified by replacing [INSERTION FIELD 2] field with the text indicative of the title of the movie (e.g., "Titanic"). In another example, the media guidance application may store a natural language template "Hello! Would anyone know what is the title of the movie this screenshot is from?" That template may be used to ask for a title of a movie. In some embodiments, this template may be modified by the addition of an image (e.g., a screenshot).

In some embodiments, the media guidance application may insert the first label field and an identifier of the media asset into the stored natural language request template to generate the natural language request. For example, when the identifier of the media asset is a text segment, the media guidance application may insert that text segment into the stored natural language request template. For example, if the title of the movie is known, the media guidance application may insert that title into the natural language template "Hey everyone! Does anyone who the [INSERTION FIELD 1] was in [INSERTION FIELD 2]?" In one example, this may result in the natural language query "Hey everyone! Does anyone know who the lead actress was in Titanic?"

In another example, when the identifier of the media asset is an image, the media guidance application may insert the image into the stored natural language request template. For example, the media guidance application may acquire a screenshot from a stored movie and insert it into the template that includes the text "Hello! Would anyone know what the title is of the movie this screenshot is from?" In one example, this may result in a natural language query with a text portion and an image portion.

In some embodiments, the media guidance application may generate for display the natural language request on a multi-user forum accessible via a network to the plurality of users. For example, the media guidance application may use a Hypertext Transfer Protocol (HTTP) POST command to make the natural language request visible on an Internet movie forum (e.g., a website) that would be visible to any user on the Internet. The multi-user forum may be a private website or third-party website (e.g., a website hosted by Amazon™ or Reddit™).

In some embodiments, the media guidance application (or a third-party application) may receive, via a user interface of the webpage, a reply to the natural language request from a first user of the plurality of users and a reply to the natural language request from a second user of the plurality of users. For example, multiple users may use a posting functionality of a website to submit comments that may be received by the media guidance application (or a third-party application). In some embodiments, the media guidance application may generate for display the first reply and the second reply on the multi-user forum. For example, the media guidance application (or a third-party application) may use an HTTP POST command to make the user replies visible on an Internet movie forum (e.g., a website) that would also be visible to any user on the Internet.

In some embodiments, the media guidance application may determine that a plurality of replies was received in response to the natural language request by accessing the multi-user forum at a second time. For example, the media guidance application may periodically retrieve all data from the multi-user forum using an HTTP GET command. In some embodiments, the media guidance application may determine the multi-user forum includes data that was not published on the multi-user forum at the first time (e.g., the time when the natural language request was first posted). In some embodiments, the media guidance application may store the data that was published on the multi-user forum at the second time but not at the first time as a first reply of the plurality of replies.

In some embodiments, the media guidance application may access the multi-user forum at a third time (e.g., a time after the second time). In some embodiments, the media guidance application may determine that the multi-user forum includes data that was not published on the multi-user forum at the second time. In some embodiments, the media guidance application may store the data that was published on the multi-user forum at the third time but not at the second time as a second reply of the plurality of replies.

In some embodiments, the media guidance application may retrieve, for a media asset, an associated first metadata item by retrieving a media asset identifier associated with the media asset. For example, the media guidance application may retrieve a title of a stored movie to be used as the identifier. In some embodiments, the media guidance application may retrieve a screenshot of a stored movie to be used as the identifier.

In some embodiments, the media guidance application may search a metadata database for a metadata item associated with the media asset identifier. For example, the media guidance application may search a remote database or local storage for stored metadata items that match the identifier. In some embodiments, the media guidance application may retrieve from storage the metadata item that is associated with the media asset identifier based on the search. For example, if the media guidance application finds a metadata item with a matching title, that metadata item may retrieved.

In some embodiments, the metadata item may be a data structure including a plurality of stored ordered pairs of text values. For example, the metadata item may be a set of data pairs of labels matched with associated data. For example, a metadata item for the movie "Titanic" may include ordered pairs: {title, "Titanic"}, {actor, "Leonardo DiCaprio"}, {release year, "1997"}. In some embodiments, one of the ordered pairs may include the first label field and the associated first data field (e.g., the pair {"lead actress," " "}).

In some embodiments, the media guidance application may search the plurality of stored ordered pairs of text values to identify the first ordered pair that includes the first label field and the associated first data field. For example, the media guidance application may search the plurality of stored ordered pairs to identify a pair with the first value "Actress." In some embodiments, the media guidance application may replace the textual value of the associated first data field with the textual value of the text segment (determined via the use of the multi-user forum). For example, if the ordered pair was {Title, " "}, the updated pair may be {Title, "Titanic"}. In some embodiments, the media guidance application may store the updated first ordered pair as a part of the plurality of stored ordered pairs.

In some embodiments, the media guidance application may identify a plurality of text segments common to at least some replies of the plurality of replies. For example, both the text segments "Kate Winslet" and "It was Kate Winslet" may have been identified. In some embodiments, the media guidance application may calculate the length of each text segment of the plurality of text segment. In some embodiments, all text segments shorter than a certain threshold length (e.g., 4 characters) may be excluded (to avoid catching words like "the" or "is"). In some embodiments, the media guidance application may select the shortest text segment of the plurality of text segments. For example, out of the options "Kate Winslet" and "It was Kate Winslet," the media guidance application may select the text segment "Kate Winslet" because it is shorter.

BRIEF DESCRIPTION OF THE DRAWINGS

The below and other objects and advantages of the disclosure will be apparent upon consideration of the following detailed description, taken in conjunction with the accompanying drawings, in which like reference characters refer to like parts throughout, and in which.

DETAILED DESCRIPTION

In some embodiments, a media guidance application may determine that a certain metadata associated with a certain label is both missing locally and unable to be obtained from a remote database. The media guidance application may publish a request for that metadata on a public multi-user forum. The media guidance application may monitor the multi-user forum to detect that multiple replies were posted and may compare the posted replies with one another to identify a text segment that is common to several replies. That text segment may be stored in place of the missing metadata.

As used herein, the term "metadata item" may refer to any kind of data or data structure that includes information about other data or data structures. In some embodiments, a media asset may be associated with a metadata item that includes information about that media asset. For example, the movie "Titanic" may be associated with a metadata structure that includes information about the title of that movie, the cast of that movie, any other information about that movie or any combination thereof.

As used herein, the term "natural language request" may refer to any kind of question, query or a request that is formed in a language comprehensible to a human reader. For example, a natural language request may be an English language question. In some embodiments, natural language request may include a text portion, a voice portion, a symbolic portion, or any combination thereof.

As used herein, the term "publishing the natural language request to a plurality of users" may refer to any manner of making the natural language request available for viewing or listening to at least two different users. For example, the natural language request may be published on a webpage accessible via the Internet, an intranet, a Local Area Network ("LAN"), any other network, or any combination thereof.

Figure 1:
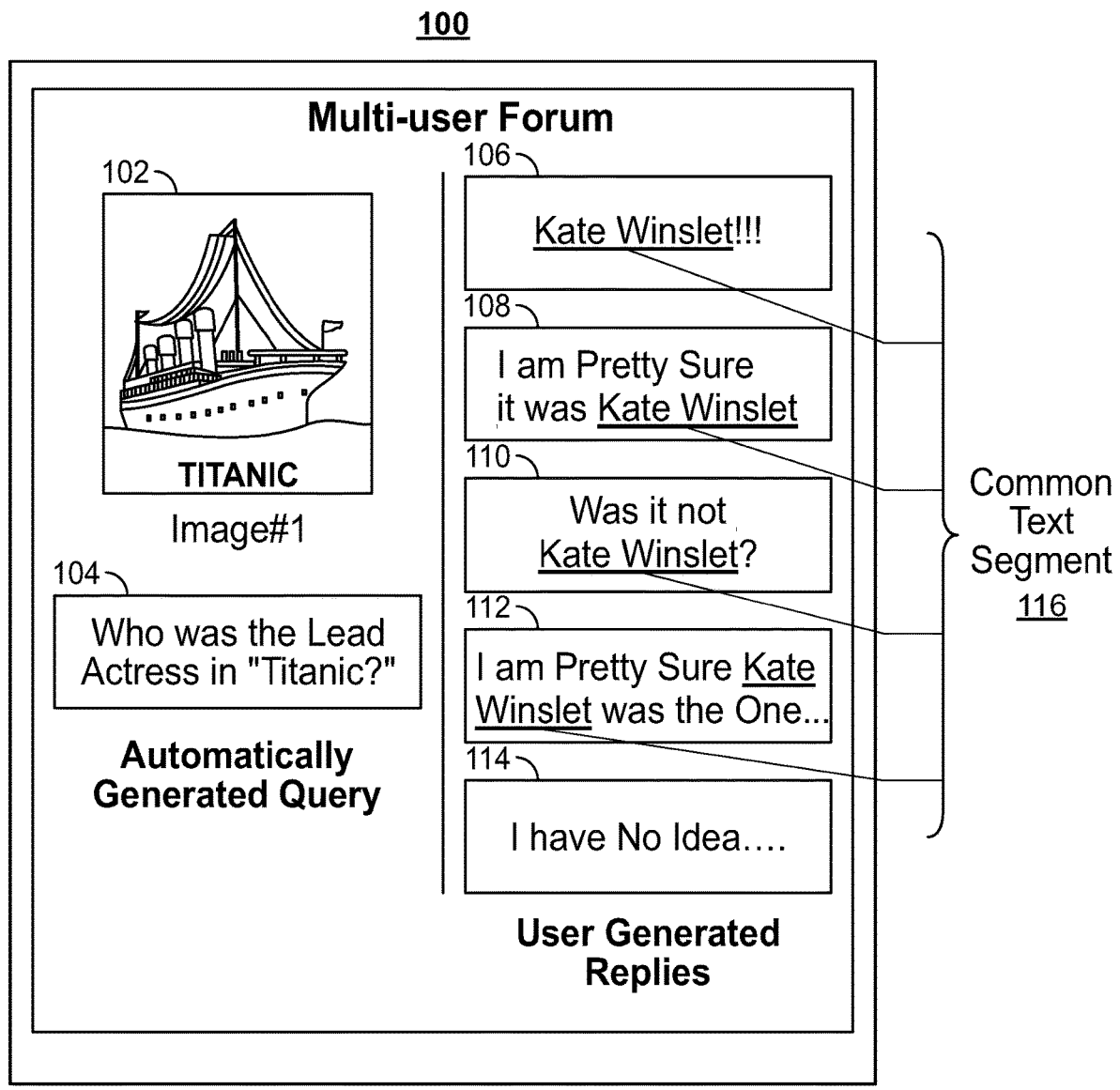
FIG. 1 shows an illustrative media guidance interface for viewing a published natural language query and associated plurality of user responses, in accordance with some embodiments of the disclosure.

FIG. 1 shows an illustrative interface 100 for viewing a published natural language query and an associated plurality of user responses, in accordance with some embodiments of the disclosure.

In some embodiments, interface 100 may be a webpage that is viewable to a plurality of users via the Internet or via any other network connection. In some embodiments, interface 100 may be a multi-user Internet forum hosted by the media guidance application or by a third party (e.g., by any web hosting company). In some embodiments, the media guidance application may automatically generate for display query 104 on interface 100.

The media guidance application may generate for display query 104 on interface 100 in response to determining that a portion of a metadata item for a media asset is missing. For example, the media guidance application may determine that a clip of the movie "Titanic" that is stored on the user's computer is missing information associated with a label "Lead Actress." The media guidance application may attempt to acquire the missing portion of the metadata item from a remote server (e.g., from a media guidance data source). For example, the media guidance application may transmit a request to a remote database for other metadata items associated with the media asset that have a field with an associated label. The request may include the label that the database may use to search its entries in order to locate the appropriate metadata item. If such a metadata item is found, the media guidance application may acquire the missing metadata from the remote database. Otherwise, the media guidance application may automatically acquire the missing metadata from a multi-user forum as described below.

The media guidance application may generate query 104 for display on a website that is available to a plurality of users via the Internet. The media guidance application may generate query 104 for display as a part of a media guidance application interface available to a plurality of users via their set-top-boxes. For example, query 104 may include a generated natural language text portion (e.g., "Who was the lead actress in Titanic?"). The media guidance application may generate query 104 to include an image 102 relating to the request. For example, image 102 may be a screenshot extracted from the stored media asset by the media guidance application. The media guidance application may use the screenshot as an identifier of the media asset. For example, query 104 may include a generated natural language text portion (e.g., "What is the title of the movie in the screenshot?").

A plurality of users may be able to respond to the query 104 by posting replies using interface 100. For example, when interface 100 is a webpage, the users may submit replies using the comment section of that webpage. In some embodiments, the received user replies may be generated for display on interface 100. For example, the media guidance application (or a third-party application) may generate for display user replies 106, 108, 110, 112, and 114.

The media guidance application may analyze the plurality of received replies to identify the missing metadata. The media guidance application may compare each of replies 106, 108, 110, 112, and 114 to each other to determine that at least some of the replies 106, 108, 110, 112, and 114 include a common text segment. For example, the media guidance application may determine that replies 106, 108, 110, and 112 all include the text segment "Kate Winslet." The media guidance application may select a text segment that is common to at least some replies 106, 108, 110, and 112. For example, the media guidance application may select the text segment "Kate Winslet" as the missing metadata for the label "Lead Actress."

The media guidance application may set the missing data field of the metadata item to the selected text segment. For example, if a data field associated with a label filed "Lead Actress" was missing, the media guidance application may set that data filed to the text segment "Kate Winslet."

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
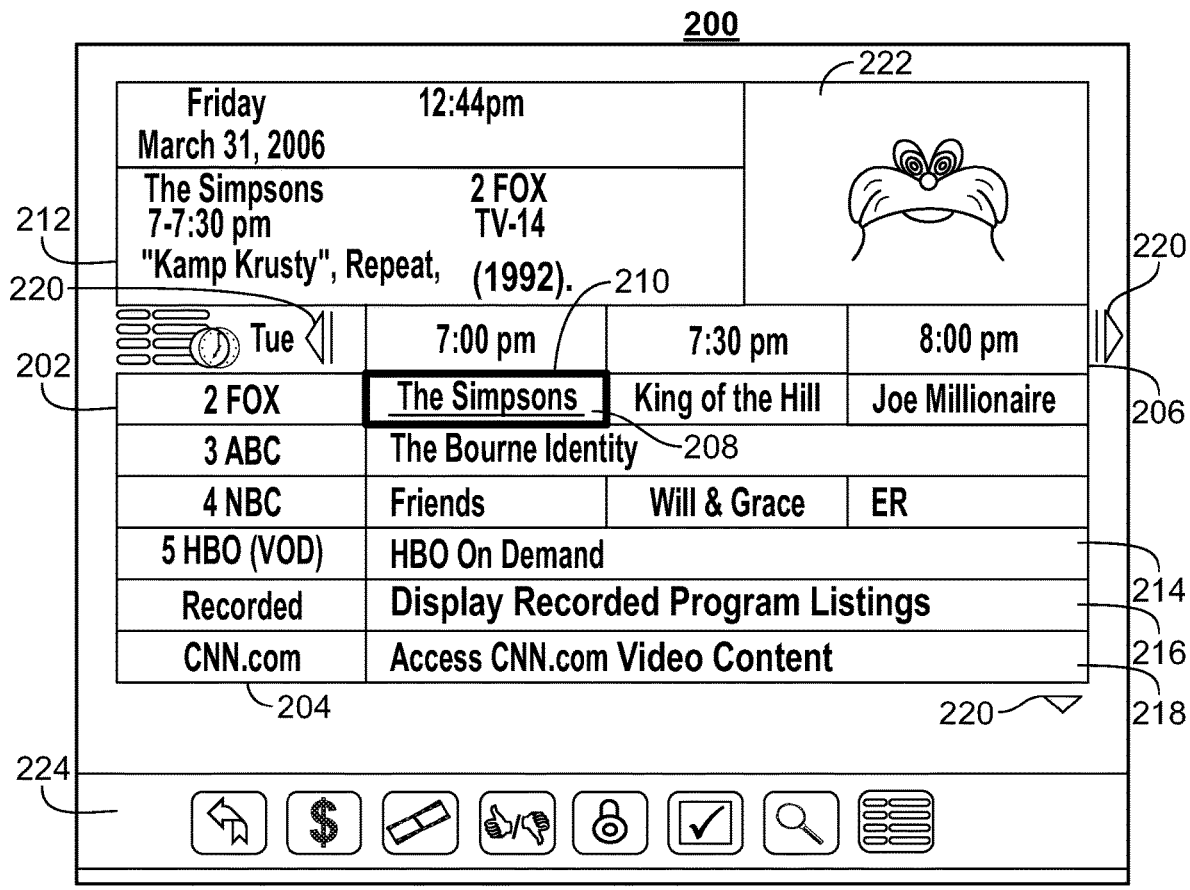
FIG. 2 shows an illustrative media guidance interface that may dynamically include or exclude a video, in accordance with some embodiments of the disclosure.
Figure 3:
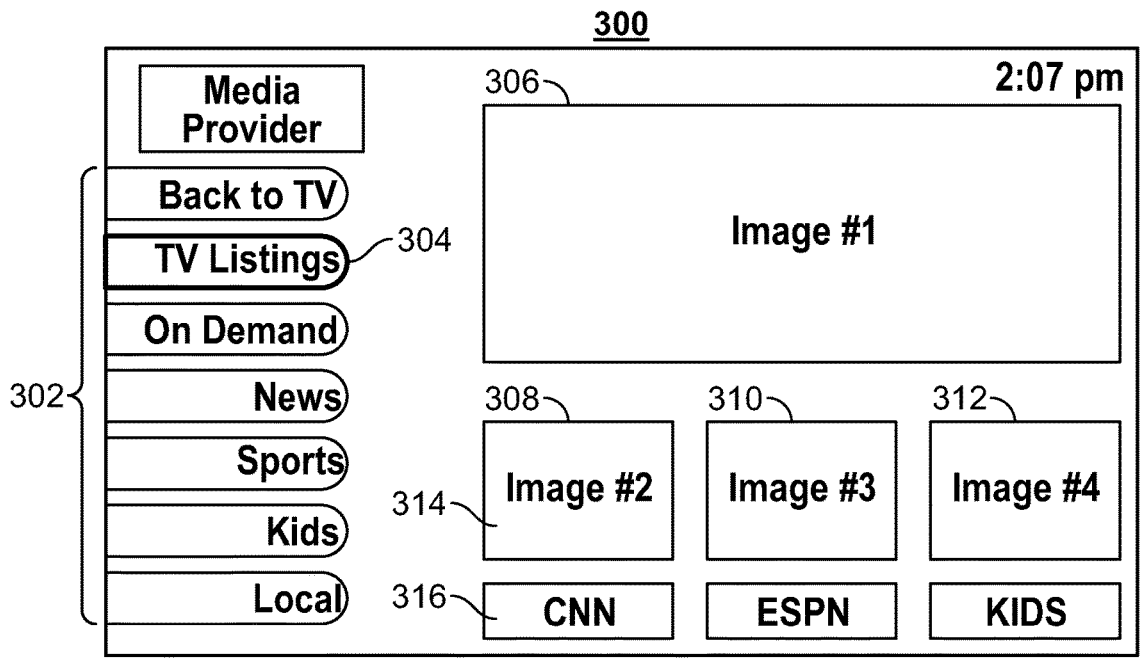
FIG. 3 shows another illustrative media guidance interface that may dynamically include or exclude a video, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option generated on a display screen (e.g., a menu option, a listings option, an icon, a hyperlink, etc.) or pressing a dedicated button (e.g., a GUIDE button) on a remote control or other user input interface or device. In response to the user's indication, the media guidance application may generate a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
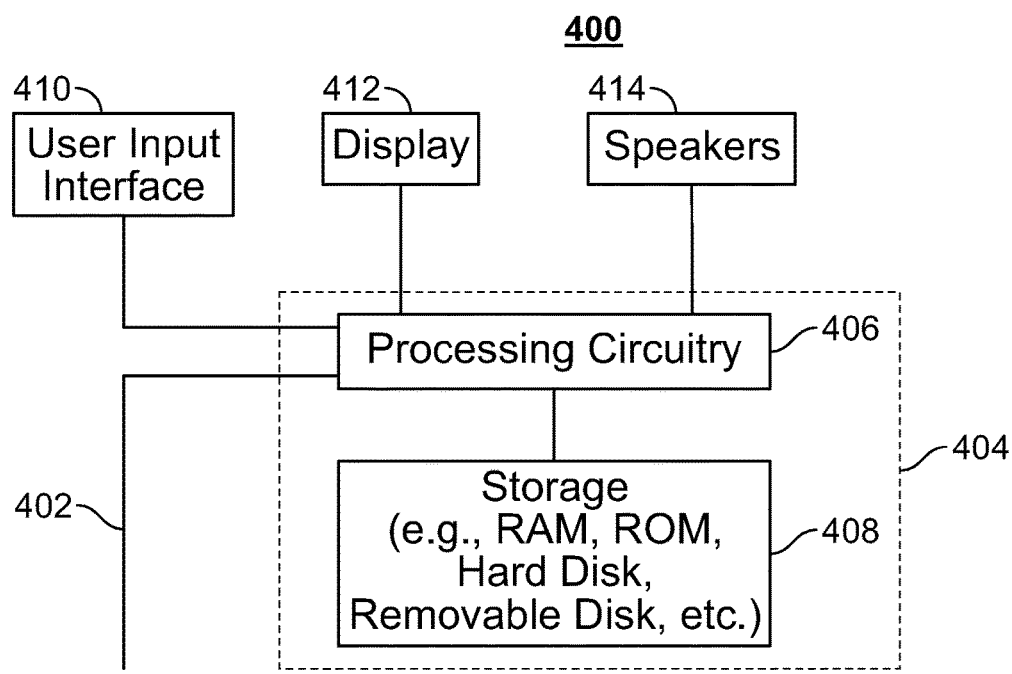
FIG. 4 is a block diagram of an illustrative user equipment device, in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
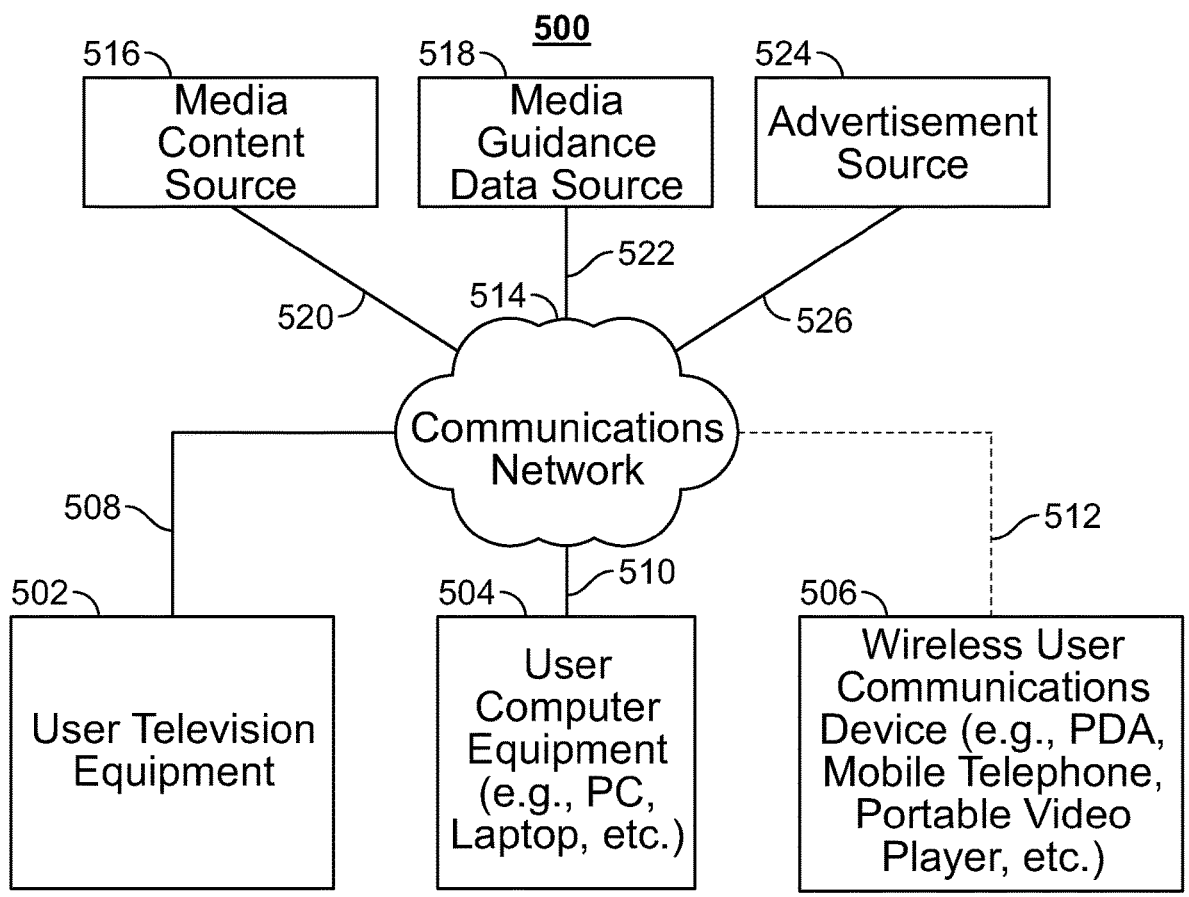
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

System 500 may also include an advertisement source 524 coupled to communications network 514 via a communications path 526. Path 526 may include any of the communication paths described above in connection with paths 508, 510, and 512. Advertisement source 524 may include advertisement logic to determine which advertisements to transmit to specific users and under which circumstances. For example, a cable operator may have the right to insert advertisements during specific time slots on specific channels. Thus, advertisement source 524 may transmit advertisements to users during those time slots. As another example, advertisement source may target advertisements based on the demographics of users known to view a particular show (e.g., teenagers viewing a reality show). As yet another example, advertisement source may provide different advertisements depending on the location of the user equipment viewing a media asset (e.g., east coast or west coast).

In some embodiments, advertisement source 524 may be configured to maintain user information including advertisement-suitability scores associated with user in order to provide targeted advertising. Additionally or alternatively, a server associated with advertisement source 524 may be configured to store raw information that may be used to derive advertisement-suitability scores. In some embodiments, advertisement source 524 may transmit a request to another device for the raw information and calculate the advertisement-suitability scores. Advertisement source 524 may update advertisement-suitability scores for specific users (e.g., first subset, second subset, or third subset of users) and transmit an advertisement of the target product to appropriate users.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Detailed descriptions of FIGS. 6-10 are provided below. It should be noted that processes 600-1000, or any step thereof, could be performed on, or provided by, any of the devices shown in, or described with respect to, FIGS. 4-5. For example, either process 500 or process 600 may be executed by control circuitry 404 (FIG. 4) as instructed by the media guidance application(s) implemented on user equipment 502, 504, and/or 506 (FIG. 5). In addition, one or more steps of processes 600 and 700 may be incorporated into, or combined with, one or more steps of any other process or embodiment.

Figure 6:
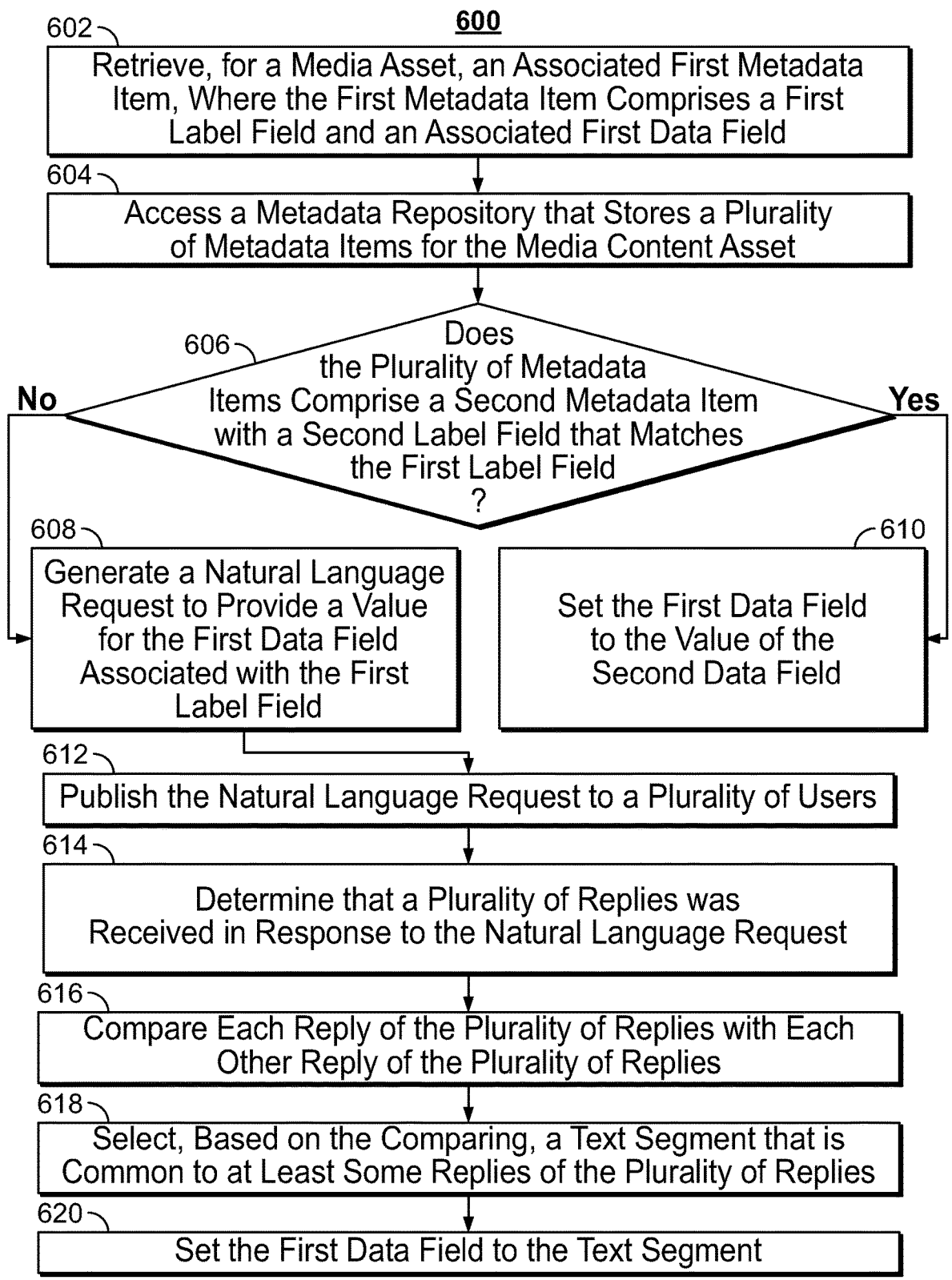
FIG. 6 depicts an illustrative flow diagram for a process of generating metadata for a media asset, in accordance with some embodiments of the disclosure.

FIG. 6 depicts an illustrative flow diagram of a process 600 for generating metadata for a media asset in accordance with an embodiment of the disclosure. Process 600 may be executed by control circuitry 404 (e.g., in a manner instructed to control circuitry 404 by the media guidance application). Control circuitry 404 may be a part of user equipment (e.g., user television equipment 502, user computer equipment 504, and/or wireless communications device 506), or of a remote server separated from the user equipment by way of communications network 514.

Process 600 begins at 602, where control circuitry 404 may retrieve, for a media asset, an associated first metadata item. For example, the media asset may be the movie "Titanic" stored on user television equipment 502 or user computer equipment 504. In some embodiments, the media asset may be stored at media guidance source 516 or media guidance data source 518. In some embodiments, the first metadata item may be retrieved from storage 408, from storage of television equipment 502 or user computer equipment 504, or from media guidance data source via network 514. In some embodiments, the first metadata item may include multiple pairs of labels and associated data fields. For example, the first metadata item may be a table (e.g., Table 1, illustrated below).

TABLE 1

| Label | Data Field |
|---|---|
| Title | Titanic |
| Lead Actor | Leonardo DiCaprio |
| Lead Actress | |
| Year | 1997 |

In some embodiments, the first metadata item may be a data structure that includes a plurality of stored ordered pairs of text values. For example, the first metadata item may include ordered pairs: {Title, "Titanic"}, {Lead Actor, "Leonardo DiCaprio"}, {Lead Actress, " "}, {Year, "1997"}. In some embodiments, the first metadata item may include a first ordered pair that includes the first label field and the associated first data field (i.e., the ordered pair {Lead Actress, " "}).

In some embodiments, the first metadata item may include a first label field (e.g., Title) and an associated first data field. In some embodiments, control circuitry 404 may determine that the first data field is blank, empty or filled with zeros.

In some embodiments, control circuitry 404 may retrieve a media asset identifier associated with the media asset. In some embodiments, the media asset identifier may be a title of the media asset. For example, if the media asset was recorded on the user's DVR (or any other device of user television equipment 502) from a broadcast source, control circuitry 404 may retrieve a media asset identifier from an Electronic Program Guide (EPG) entry associated with that broadcast source at the time of the recording. For example, control circuitry 404 may have recorded broadcast content that was broadcast on channel 3 between 1:00 PM and 3:00 PM as the media asset. In this example, control circuitry 404 may consult an EPG table stored at media guidance data source 518 to determine that the movie "Titanic" was scheduled for broadcast on channel 3 at that time. In this example, control circuitry 404 may retrieve the title "Titanic" as the media asset identifier associated with the media asset.

In some embodiments, control circuitry 404 may search a metadata database for a metadata item associated with the media asset identifier. In some embodiments, control circuitry 404 may search a metadata database stored on storage 408. In some embodiments, control circuitry 404 may search a metadata database stored at media guidance data source 518. In some embodiments, the metadata database may include a plurality of metadata items associated with different media asset identifiers. For example, the metadata database 404 may include a table (e.g., Table 1) for the movie "Titanic," a table for the movie "The Matrix," etc.

In some embodiments, control circuitry 404 may retrieve the metadata item associated with the media asset identifier based on the searching. For example, control circuitry 404 may determine that a certain table (e.g., Table 1) is associated with the movie "Titanic" which matches the media asset identifier "Titanic." In this case, control circuitry 404 may retrieve Table 1 from the metadata database (e.g., via network 514).

Process 600 continues at 604, where control circuitry 404 may access a metadata repository that stores a plurality of metadata items for the media asset. In some embodiments, step 604 may be performed in response to a determination that the first data field is blank, empty or filled with zeros. In some embodiments, control circuitry 404 may access a metadata repository stored on media guidance data source 518 via network 514. In some embodiments, the metadata repository may include multiple tables with labels and associated data fields related to the movie "Titanic."

Process 600 continues at 606, where control circuitry 404 may determine whether the plurality of metadata items includes a second metadata item with a second label field that matches the first label field. For example, control circuitry 404 may search the metadata repository to identify a table related to the movie "Titanic" that includes a label "Lead Actress." In some embodiments, in response to determining that the plurality of metadata items does not include a second metadata item with a second label field that matches the first label field, process 600 may continue at 608. In some embodiments, in response to determining that the plurality of metadata items includes a second metadata item with a second label field that matches the first label field, process 600 may continue at 610.

At 610, control circuitry 404 may set the first data field to the value of the second data field of the second metadata item of the plurality of metadata items. For example, if the second data field is "Kate Winslet," control circuitry 404 may set the value of the first data field to the text "Kate Winslet."

At 608, control circuitry 404 may generate a natural language request to provide a value for the first data field associated with the first label field. In some embodiments, step 608 is performed in response to determining that the plurality of metadata items does not include the second metadata item with the second label field that matches the first label field. In some embodiments, control circuitry 404 may use pre-stored templates to generate the natural language request. For example, control circuitry 404 may insert a text value of the label and an identifier of the media asset into a template to generate the natural language request. For example, the template "Hey everyone! Does anyone know who the [INSERTION FIELD 1] was in [INSERTION FIELD 2]?" may be updated with the text of the first label (e.g., lead actress) and with an identifier of the media asset (e.g., "Titanic"). In some embodiments, the resulting natural language request may be "Hey everyone! Does anyone who the lead actress was in Titanic?"

Process 600 continues at 612, where control circuitry 404 may publish the natural language request to a plurality of users. For example, control circuitry 404 may post the natural language request on a website (e.g., on interface 100 of FIG. 1). For example, the natural language request may be generated for display as query 104 of FIG. 1.

In some embodiments, control circuitry 404 may generate for display the natural language request on a multi-user forum accessible via a network to the plurality of users. For example, control circuitry 404 may use an HTTP POST command to store the natural language request on a back end of a web server, such that the natural language request would be viewable to users who can access the webserver via an HTTP connection. In some embodiments, natural language request may be viewable to users as request 104 of FIG. 1.

In some embodiments, control circuitry 404 may receive, via a user interface of the multi-user forum, a reply to the natural language request from a first user of the plurality of users and a reply to the natural language request from a second user of the plurality of users. For example, when the multi-user forum is a webpage, each user may type a reply into a text input field available on that website and click "post" or "submit button." In some embodiments, control circuitry 404 may receive the reply submitted by the user via a network. In some embodiments, the received replies may be one or more of the replies 106-114 depicted in FIG. 1.

In some embodiments, control circuitry 404 may generate for display the first reply and the second reply on the multi-user forum. For example, control circuitry 404 may use an HTTP POST command to store each reply on a back end of the web server, such that each received reply would be viewable to users who can access the webserver via an HTTP connection. For example, the replies may be viewable in a comment section of a website that also includes the original natural language request. In some embodiments, the website may be interface 100 of FIG. 1.

Process 600 continues at 614, where control circuitry 404 may determine that a plurality of replies (e.g., replies 106-114) was received in response to the natural language request. In some embodiments, control circuitry 404 may periodically access the multi-user forum on which the natural language request was posted. Each time the multi-user forum is accessed, control circuitry 404 may retrieve new user comments that have appeared there since the time when the natural language request was posted. In some embodiments, step 614 may be periodically repeated until a threshold number of replies (e.g., three replies or five replies) is received.

At 616, control circuitry 404 may compare each reply of the plurality of replies with each other reply of the plurality of replies. For example, control circuitry 404 may select a segment of a first reply and search all other replies to check whether they also contain that segment. In some embodiments, a plurality of text segments common to at least some replies may be identified.

Process 600 continues at 618, where control circuitry 404 may select, based on the comparing of step 616, a text segment that is common to at least some replies of the plurality of replies. For example, control circuitry 404 may determine that a plurality of text segments is common to at least some replies. In some embodiments, control circuitry 404 may discard all common text segments that are shorter than a threshold length (e.g., shorter than 6 characters and/or shorter than one word). This technique would help cause circuitry 404 to avoid selecting common words like "the" and "a," and avoid a selection of word fragments. In some embodiments, control circuitry 404 may select a text segment from the remaining text segments that is the shortest in length. For example, control circuitry 404 may determine that both text segments "Titanic" and "It is Titanic" are common to at least some replies. In some embodiments, control circuitry 404 may select the text segment "Titanic" as the most relevant text segment.

In some embodiments, control circuitry 404 may identify a plurality of text segments common to at least some replies of the plurality of replies. For example, control circuitry 404 may identify that text segments "it," "was," "Titanic" and "it was Titanic" are common to at least some of the plurality of replies (e.g., replies 106-114 of FIG. 1). In some embodiments, control circuitry 404 may calculate the length of each text segment of the plurality of text segments. For example, control circuitry 404 may determine that text segment "it" has length of "2;" text segment "was" has length of "3;" text segment "Titanic" has length of "7;" and text segment "it was Titanic" has length of "14." In some embodiments, control circuitry 404 may remove text segments from the plurality of segments that have a length that is shorter than a threshold length (e.g., 6 characters.) In some embodiments, only the text segments "Titanic" and "it was Titanic" remain after such a removal.

In some embodiments, control circuitry 404 may select the shortest text segment of the plurality of text segments. In an example, control circuitry 404 may select the text segment "Titanic" over the text segment "it was Titanic."

Process 600 continues at 620, where control circuitry 404 may set the first data field to the selected text segment. For example, if the selected text segment is "Kate Winslet," control circuitry 404 may update Table 1 as illustrated in Table 2:

TABLE 2

| Label | Data Field |
|---|---|
| Title | Titanic |
| Lead Actor | Leonardo DiCaprio |
| Lead Actress | Kate Winslet |
| Year | 1997 |

In some embodiments, where the metadata item is a data structure including a plurality of stored ordered pairs of text values, control circuitry 404 may search the plurality of stored ordered pairs of text values to identify the first ordered pair that includes the first label field and the associated first data field. For example, if the ordered pairs include: {Title, "Titanic"}, {Lead Actor, "Leonardo DiCaprio"}, {Lead Actress, " "}, {Year, "1997"}, control circuitry 404 may search for the ordered pair where the first value is equal to Lead Actress.

In some embodiments, control circuitry 404 may replace the textual value of the associated first data field with the textual value of the text segment. For example, the ordered pair {Lead Actress, " "} may be updated to includes values {Lead Actress, "Kate Winslet"}. In some embodiments, control circuitry 404 may store the updated first ordered pair as a part of the plurality of stored ordered pairs. For example, the updated plurality of stored ordered pairs may be stored on storage 408.

Figure 7:
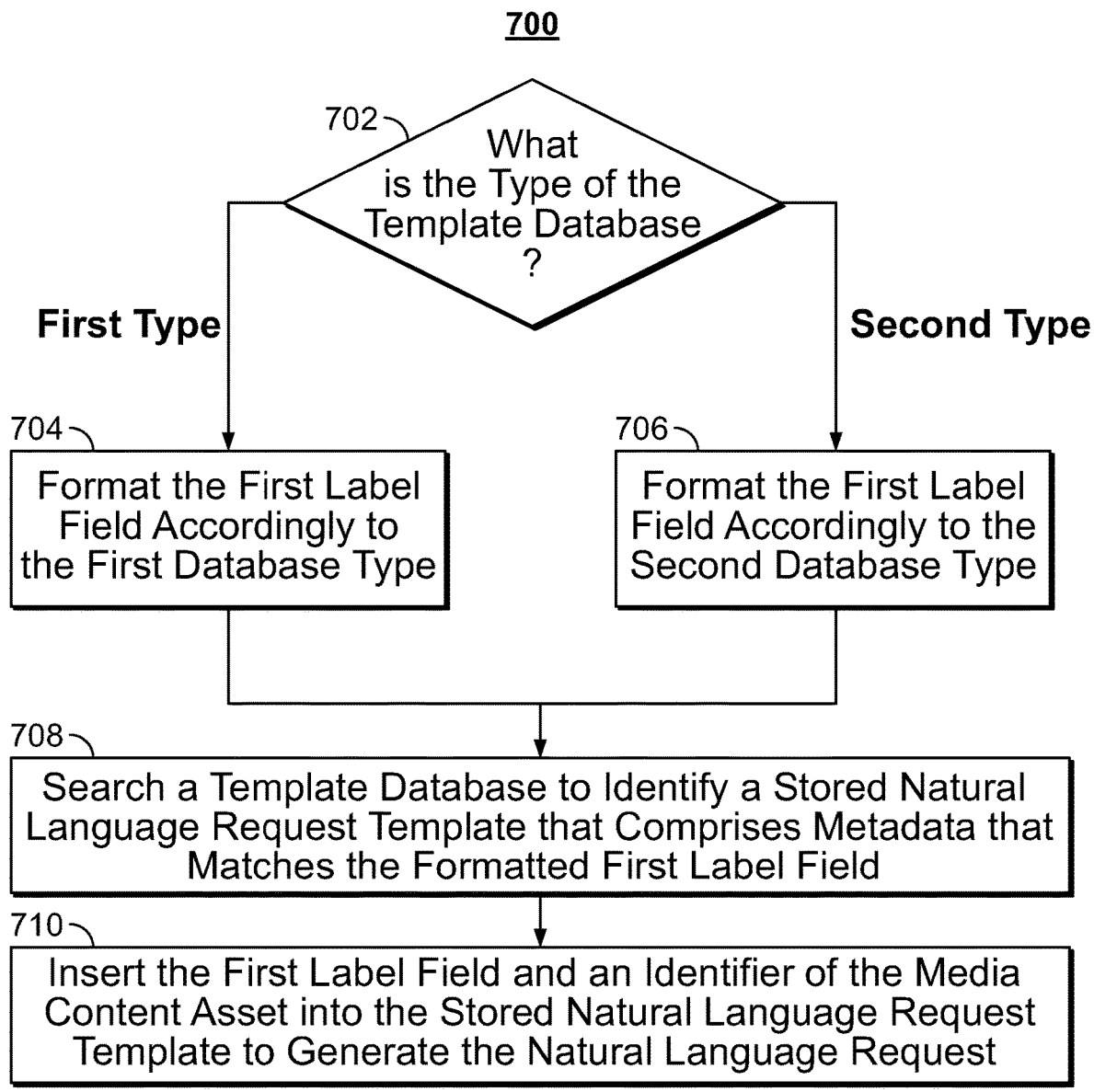
FIG. 7 depicts an illustrative flow diagram for a process of generating a natural language request, in accordance with some embodiments of the disclosure.

FIG. 7 depicts an illustrative flow diagram of a process 700 for generating a natural language request in accordance with an embodiment of the disclosure. Process 700 may be executed by control circuitry 404 (e.g., in a manner instructed to control circuitry 404 by the media guidance application). Control circuitry 404 may be a part of user equipment (e.g., userb television equipment 502, user computer equipment 504, and/or wireless communications device 506), or of a remote server communicatively connected to the user equipment by way of communications network 514. In some embodiments, process 700 may be performed as part of step 608.

Process 700 begins at 702 where control circuitry 404 may determine the type of an available template database that is used to retrieve templates for constructing a natural language query. In some embodiments, control circuitry 404 may request a template database description from media guidance data source 518. In some embodiments, control circuitry 404 may determine whether the template database is a database of a first database type or a database of a second database type. For example, a first type of a database may be a Structured Query Language (SQL) database or a MySQL database. In another example, a second type of a database may be an Access™ database. In some embodiments, when control circuitry 404 determines that the database is of the first type, process 700 may continue at 704. In some embodiments, when control circuitry 404 determines that the database is of the second type, process 700 may continue at 706.

At 704, control circuitry 404 may format the first label field according to the first database type. For example, control circuitry 404 may format first label field (e.g., text Title) as an SQL query. For example, control circuitry 404 may combine the text Lead Actress with a preformatted SQL search string to create a query: SELECT Lead Actress FROM TEMPLATE_LIST where TEMPLATE_LIST is a table of natural language request templates.

At 706, control circuitry 404 may format the second label field according to the first database type. For example, control circuitry 404 may format first label field (e.g., text Title) as an Access database query. For example, control circuitry 404 may combine the text Lead Actress with a preformatted Access search string to create a query: TEMPLATE_LIST="Title" where TEMPLATE_LIST is a table of natural language request templates.

Process 700 continues at 708, where control circuitry 404 searches a template database to identify a stored natural language request template that includes metadata that matches the first label field. In some embodiments, the template database may be stored in storage 408. In some embodiments, control circuitry 404 may search a database that is stored remotely (e.g., at media guidance data source 518). For example, if the label field has a textual value lead actress, control circuitry 404 may search the template database to identify a template that is suitable for asking users about a lead actress. In some embodiments, control circuitry 404 may search the template database using a search string generated at step 704 or 706.

In some embodiments, a template "Hey everyone! Does anyone know who the [INSERTION FIELD 1] was in [INSERTION FIELD 2]?" may have an associated metadata specifying that this template is usable for asking users about the following list of topics: lead actress, lead actor, support actor, support actress. In some embodiments, control circuitry 404 may identify this template as suitable because its metadata indicates suitability for requests about a lead actress.

Process 700 continues at 710, where control circuitry 404 inserts the first label field and an identifier of the media asset into the stored natural language request template to generate the natural language request. In some embodiments, the identifier of the media asset may be a text segment. For example, the identifier of the media asset may be a title of the movie "Titanic." In this example, control circuitry 404 may insert the text "Titanic" and the text "Lead Actress" into a template to create natural language request "Hey everyone! Does anyone know who the lead actress was in Titanic?"

In some embodiments, the identifier of the media asset may be an image. For example, if the title of the media asset in unavailable, control circuitry 404 may extract a screenshot for use as an identifier. For example, control circuitry 404 may insert the screenshot into a template to create a natural language request "Hey everyone! Does anyone know who the lead actress was in this movie? (screenshot attached)." In some embodiments, the natural language request may be generated for display as request 104 and image 102 of FIG. 1.

Figure 8:
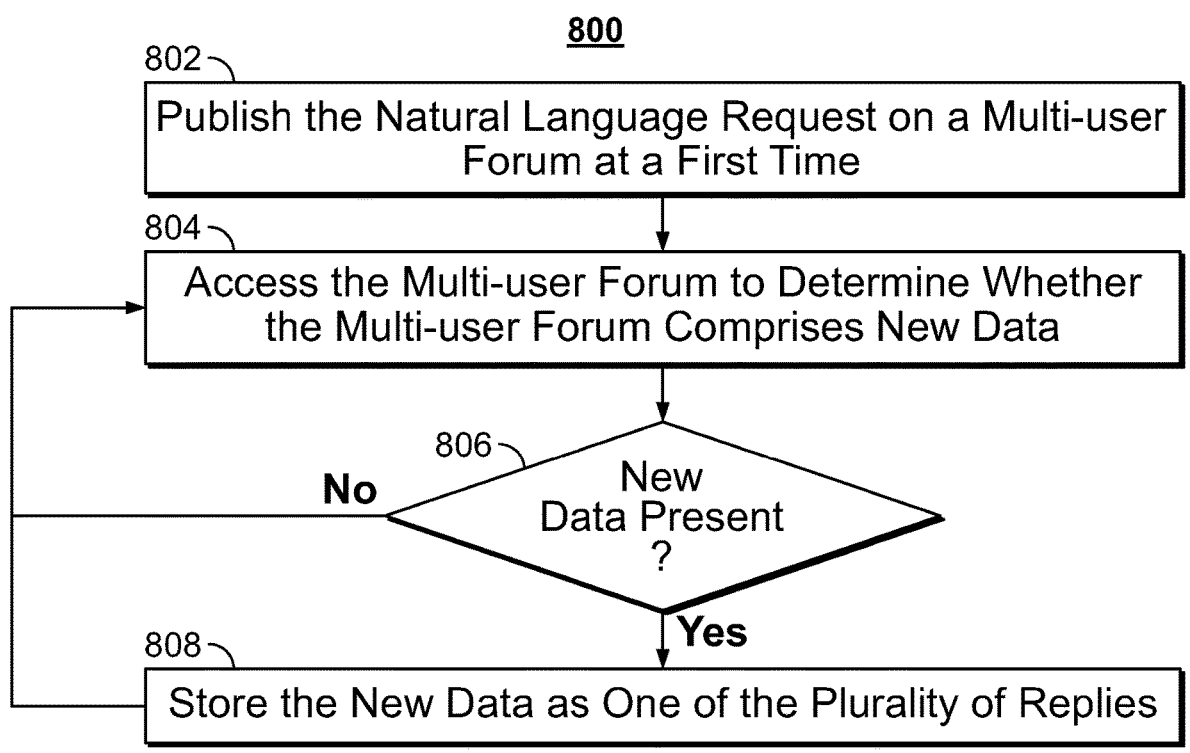
FIG. 8 depicts an illustrative flow diagram for a process of determining that a plurality of replies was received in response to the request, in accordance with some embodiments of the disclosure.

FIG. 8 depicts an illustrative flow diagram of a process 800 for determining that a plurality of replies was received in response to the request in accordance with an embodiment of the disclosure. Process 800 may be executed by control circuitry 404 (e.g., in a manner instructed to control circuitry 404 by the media guidance application). Control circuitry 404 may be a part of user equipment (e.g., user television equipment 502, user computer equipment 504, and/or wireless communications device 506), or of a remote server separated from the user equipment by way of communications network 514. In some embodiments, process 800 may be performed as part of step 614.

Process 800 begins at step 802, where control circuitry 404 may publish the natural language request to a plurality of users by publishing the natural language request on a multi-user forum at a first time. In some embodiments, the natural language request may be published as described in connection with step 612 of FIG. 6. In some embodiments, control circuitry 404 may publish the natural language request (e.g., request 104 of FIG. 1) at 1:00 PM.

Process 800 continues at step 804, where control circuitry 404 may access the multi-user forum to determine whether the new multi-user forum database includes new data. For example, control circuitry 404 may compare a snapshot of the multi-user forum taken the last time control circuitry 404 accessed the multi-user forum to a new snapshot of the multi-user forum.

In some embodiments, control circuitry 404 may access the multi-user forum at a second time to determine that the multi-user forum includes data that was not published on the multi-user forum at the first time. For example, control circuitry 404 may access the multi-user forum one minute after the natural language request was published (e.g., at 1:01 PM). In some embodiments, control circuitry 404 may access the multi-user forum after any kind of a time interval. In some embodiments, while accessing the multi-user forum at the second time, control circuitry 404 may determine that a new reply (e.g., reply 106) has appeared on the multi-user forum that was not present on the multi-user forum at the first time. In some embodiments, control circuitry 404 may store reply 106 as one of the plurality of replies.

In some embodiments, control circuitry 404 may access the multi-user forum at a third time to determine that the multi-user forum includes data that was not published on the multi-user forum at the second time. For example, control circuitry 404 may access the multi-user forum two minutes after the natural language request was published (e.g., at 1:02 PM). In some embodiments, control circuitry 404 may access the multi-user forum after any kind of a time interval. In some embodiments, while accessing the multi-user forum at the third time, control circuitry 404 may determine that a new reply (e.g., reply 108) has appeared on the multi-user forum that was not present on the multi-user forum at the second time. In some embodiments, control circuitry 404 may store reply 108 as one of the plurality of replies.

Process 800 continues at 806 where control circuitry 404 may proceed differently depending on whether new data was discovered at step 806. In some embodiments, if no new data was present at the multi-user forum, control circuitry 404 may proceed back to step 804 (e.g., after a time-out of predestined length). For example, control circuitry 404 may proceed back to step 804 in one minute. In some embodiments, if new data was present at the multi-user forum, control circuitry 404 may proceed to step 808.

At 808, control circuitry 404 may store the new data as one of the plurality of replies. For example, control circuitry 404 may maintain a replies data structure (e.g., a set or a list) of all replies that were received. In one example, the new data identified at step 804 is added to the replies data structure, and the replies data structure may be stored (e.g., on storage 408). In some embodiments, control circuitry 404 may then proceed back to 804. In some embodiments, control circuitry 404 may determine that a plurality of replies was received when the replies data structure size exceeds a threshold (e.g., when it stores more than 3 replies).

Figure 9:
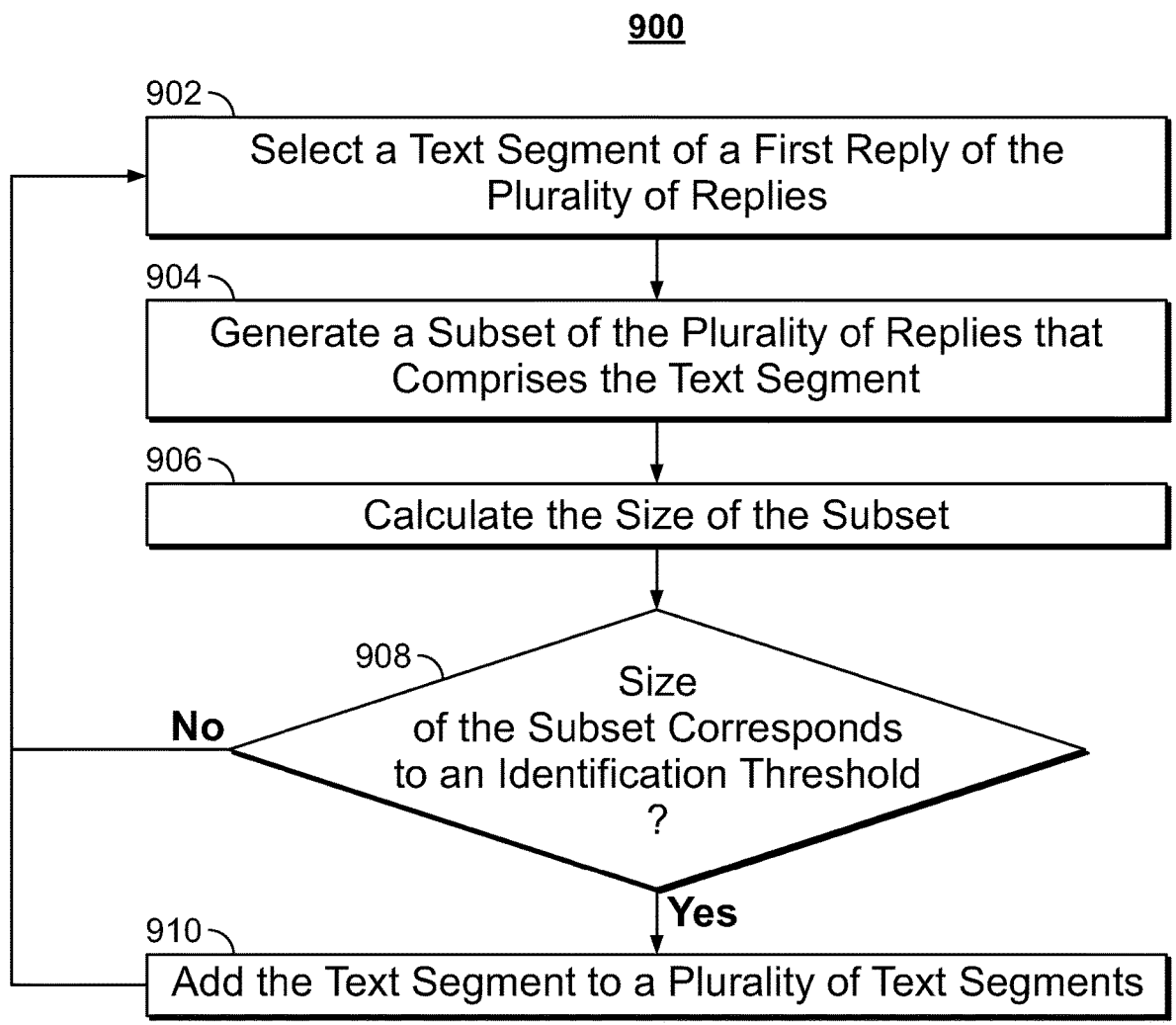
FIG. 9 depicts an illustrative flow diagram for a process of selecting text segments that are common to at least some replies of the plurality of replies, in accordance with some embodiments of the disclosure.

FIG. 9 depicts an illustrative flow diagram of a process 900 for selecting text segments that are common to at least some replies of the plurality of replies in accordance with an embodiment of the disclosure. Process 900 may be executed by control circuitry 404 (e.g., in a manner instructed to control circuitry 404 by the media guidance application). Control circuitry 404 may be a part of user equipment (e.g., user television equipment 502, user computer equipment 504, and/or wireless communications device 506), or of a remote server separated from the user equipment by way of communications network 514. In some embodiments, process 900 may be performed as part of step 618.

Process 900 begins at 902, where control circuitry 404 may select a text segment of a first reply of the plurality replies. In some embodiments, the paltry of replies may be generated as described with relation to FIG. 8. For example, control circuitry 404 may iterate through every possible combination of words of the first reply. For example, if the first reply is "It is Titanic!," control circuitry 404 may select one of the following text segments: "It," "is," "Titanic," "It is," "Is Titanic," and "It is Titanic." As the process 900 is repeated, each of these possibilities is eventually selected.

At 904, control circuitry 404 may generate a subset of the plurality of replies that include the text segment. For example, if the selected text segment "is titanic," control circuitry 404 may find all replies that includes that segment, and includes the found replies into the subset.

At 906, control circuitry 404 may calculate the size of the subset. For example, if the subset has three replies, control circuitry 404 may determine the size to be equal to "3."

At 908, control circuitry 404 may check if the seize of the subset corresponds to an indentation threshold. For example, the indentation threshold may be two replies, four replies, or any other number of replies. If the size of the subset does not correspond to the indentation threshold (e.g., if the size of subset is less than three), control circuitry 404 may proceed back to 902 and select another text segment. If the size of the subset does correspond to the indentation threshold (e.g., if the size of subset is greater than or equal to three), control circuitry 404 may proceed back to 910.

At 910, control circuitry 404 may add the text segment selected at step 902 to a plurality of text segments. In some embodiments, the plurality of text segments may be stored (e.g., in memory 408) as data structure, or as a table. In some embodiments, control circuitry 404 may use a plurality of text segments to select the text segment as described in relation to step 618. For example, control circuitry 404 may select the shortest text segment that exceeds a size threshold.

It is contemplated that the steps or descriptions of each of FIGS. 6-9 may be used with any other embodiment of this disclosure. It is contemplated that some steps or descriptions of each of FIGS. 6-9 may be optional and may be omitted in some embodiments. In addition, the steps and descriptions described in relation to FIGS. 6-9 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 4-5 could be used to perform one or more of the steps in FIGS. 6-9.

It will be apparent to those of ordinary skill in the art that methods involved in the present disclosure may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. The processing circuitry, for instance, may be a general purpose processor, a customized integrated circuit (e.g., an ASIC), or a field-programmable gate array (FPGA) within user television equipment 502, media content source 516, or media guidance data source 518.

The processes discussed above in FIGS. 6-9 are intended to be illustrative and not limiting. One skilled in the art would appreciate that the steps of the processes in FIGS. 6-9 discussed herein may be omitted, modified, combined, and/or rearranged, and any additional steps may be performed without departing from the scope of the disclosure. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for generating metadata for media assets, the method comprising:
    retrieving a first metadata item associated with a media asset, wherein the first metadata item comprises a first label field and a corresponding first data field;
    determining whether the first data field corresponding to the first label field is blank;
    accessing a metadata repository that stores a plurality of metadata items for the media asset;
        determining that a second metadata item with a second label field that matches the first label field does not exist in the metadata repository that stores the plurality of metadata items for the media asset; and
    in response to (a) determining that the first data field corresponding to the first label field is blank and (b) determining that the second metadata item does not exist in the metadata repository:
        generating a natural language request to provide a value for the first data field corresponding to the first label field;
    publishing the natural language request to a plurality of users;
    determining that a plurality of replies was received in response to the natural language request;
    comparing each reply of the plurality of replies with each other reply of the plurality of replies;
    identifying a plurality of text segments common to at least some of the replies of the plurality of replies;
    calculating a length of each text segment of the plurality of text segments;
    removing text segments that have a length that is shorter than a threshold length;
    selecting, based on the comparing, a text segment that is common to at least some replies of the plurality of replies, from the remaining text segments of the plurality of text segments that are not removed; and
    setting the first data field to the selected text segment.

2. The method of claim 1, wherein generating the natural language request comprises:
    searching a template database to identify a stored natural language request template that comprises metadata that matches the first label field; and
    inserting the first label field and an identifier of the media asset into the stored natural language request template to generate the natural language request.

3. The method of claim 2, wherein the identifier of the media asset is a text segment, and wherein inserting the identifier of the media asset into the stored natural language request template comprises inserting the text segment into the stored natural language request template.

4. The method of claim 2, wherein the identifier of the media asset is an image, and wherein inserting the identifier of the media asset into the stored natural language request template comprises inserting the image into the stored natural language request template.

5. The method of claim 1, further comprising:
    generating for display the natural language request on a multi-user forum accessible via a network to the plurality of users;
    receiving via a user interface of the multi-user forum a first reply to the natural language request from a first user of the plurality of users and a second reply to the natural language request from a second user of the plurality of users; and
    generating for display the first reply and the second reply on the multi-user forum.

6. The method of claim 1, wherein:
    publishing the natural language request to a plurality of users comprises publishing the natural language request on a multi-user forum at a first time; and
    determining that a plurality of replies was received in response to the request comprises:
        accessing the multi-user forum at a second time to determine that the multi-user forum comprises data that was not published on the multi-user forum at the first time; and
        accessing the multi-user forum at a third time to determine that the multi-user forum comprises data that was not published on the multi-user forum at the second time.

7. The method of claim 6, wherein:
    the plurality of replies comprises:
        data that was published on the multi-user forum at the second time but not at the first time; and
        data that was published on the multi-user forum at the third time but not at the second time.

8. The method of claim 1, wherein retrieving the first metadata item associated with the media asset comprises:
  retrieving a media asset identifier associated with the media asset;
  searching a metadata database for a metadata item associated with the media asset identifier; and
  retrieving the metadata item associated with the media asset identifier based on the searching.

9. The method of claim 1, wherein the first metadata item is a data structure comprising a plurality of stored ordered pairs of text values, and wherein a first ordered pair of the plurality of stored ordered pairs comprises the first label field and the corresponding first data field; and
  wherein setting the first data field to the selected text segment comprises:
    searching the plurality of stored ordered pairs of text values to identify the first ordered pair that comprises the first label field and the corresponding first data field;
    replacing the text value of the corresponding first data field with the text value of the text segment; and
    storing the first ordered pair, updated based on the replacing, as a part of the plurality of stored ordered pairs.

10. The method of claim 1, further comprising:
  identifying a plurality of text segments common to at least some replies of the plurality of replies;
  calculating a length of each text segment of the plurality of text segments; and
  selecting a shortest text segment of the plurality of text segments.

11. The method of claim 1, wherein the media asset is a movie, and wherein the plurality of metadata items for the movie comprise data pairs of labels matched with associated data, and wherein at least one metadata item of the plurality of metadata items for the movie comprises:
  a label that is at least one of: a title, an actor, or a release year, and
  associated data is at least one of: a title of the movie, an actor of the movie, or an associated release year of the movie.

12. The method of claim 1, wherein:
  the metadata repository is a remote source that stores metadata items; and
  the determining whether the plurality of metadata items comprises the second metadata item with the second label field that matches the first label field comprises:
    transmitting a request to a remote database including the first label field for the remote database to use to search its entries to locate an appropriate metadata item associated with the media asset that has a field with an associated label.

13. A system for generating metadata for media assets, the system comprising:
  control circuitry configured to:
    retrieve a first metadata item associated with a media asset, wherein the first metadata item comprises a first label field and a corresponding first data field;
    determine whether the first data field corresponding to the first label field is blank;
    access a metadata repository that stores a plurality of metadata items for the media asset;
    determine that a second metadata item with a second label field that matches the first label field does not exist in the metadata repository that stores the plurality of metadata items for the media asset; and
    in response to (a) determining that the first data field corresponding to the first label field is blank and (b) determining that the second metadata item does not exist in the metadata repository:
      generate a natural language request to provide a value for the first data field corresponding to the first label field;
      publish the natural language request to a plurality of users;
      determine that a plurality of replies was received in response to the natural language request;
      compare each reply of the plurality of replies with each other reply of the plurality of replies;
      identify a plurality of text segments common to at least some of the replies of the plurality of replies;
      calculate a length of each text segment of the plurality of text segments;
      remove text segments that have a length that is shorter than a threshold length;
      select, based on the comparing, a text segment that is common to at least some replies of the plurality of replies, from the remaining text segments of the plurality of text segments that are not removed; and
      set the first data field to the selected text segment.

14. The system of claim 13, wherein the control circuitry is further configured, when generating the natural language request, to:
  search a template database to identify a stored natural language request template that comprises metadata that matches the first label field; and
  insert the first label field and an identifier of the media asset into the stored natural language request template to generate the natural language request.

15. The system of claim 14, wherein the identifier of the media asset is a text segment, and wherein the control circuitry is further configured, when inserting the identifier of the media asset into the stored natural language request template, to insert the text segment into the stored natural language request template.

16. The system of claim 14, wherein the identifier of the media asset is an image, and wherein inserting the identifier of the media asset into the stored natural language request template comprises inserting the image into the stored natural language request template.

17. The system of claim 13, wherein the control circuitry is further configured, when publishing the natural language request to a plurality of users, to publish the natural language request on a multi-user forum at a first time; and
  wherein the control circuitry is further configured, when determining that a plurality of replies was received in response to the request, to:
    access the multi-user forum at a second time to determine that the multi-user forum comprises data that was not published on the multi-user forum at the first time; and
    access the multi-user forum at a third time to determine that the multi-user forum comprises data that was not published on the multi-user forum at the second time.

18. The system of claim 13, wherein the first metadata item is a data structure comprising a plurality of stored ordered pairs of text values, and wherein a first ordered pair of the plurality of stored ordered pairs comprises the first label field and the corresponding first data field; and wherein the control circuitry is further configured, when setting the first data field to the selected text segment, to:
  search the plurality of stored ordered pairs of text values to identify the first ordered pair that comprises the first label field and the corresponding first data field;
  replace the text value of the corresponding first data field with the text value of the text segment; and
  store the first ordered pair, updated based on the replacing, as a part of the plurality of stored ordered pairs.

19. The system of claim 13, wherein the control circuitry is further configured to:
  identify a plurality of text segments common to at least some replies of the plurality of replies;
  calculate a length of each text segments of the plurality of text segments; and
  select a shortest text segment of the plurality of text segments.

\* \* \* \* \*